No. 683,811. Patented Oct. 1, 1901.
T. W. TALIAFERRO.
APPARATUS FOR FACILITATING THE FILLING AND WEIGHING OF CANS, &c.
(Application filed May 23, 1901.)
(No Model.)
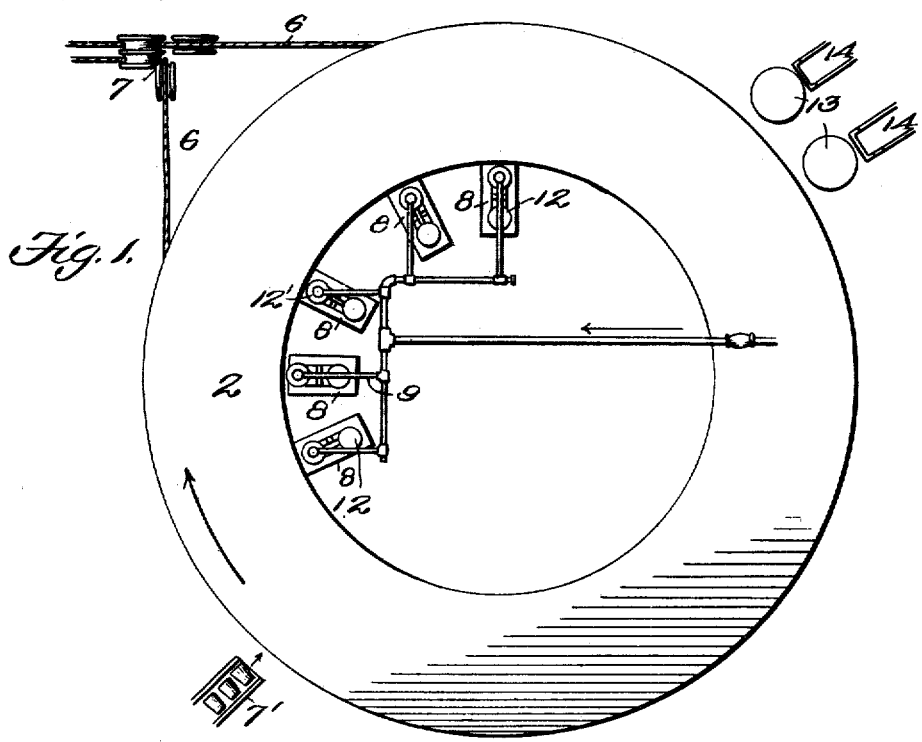
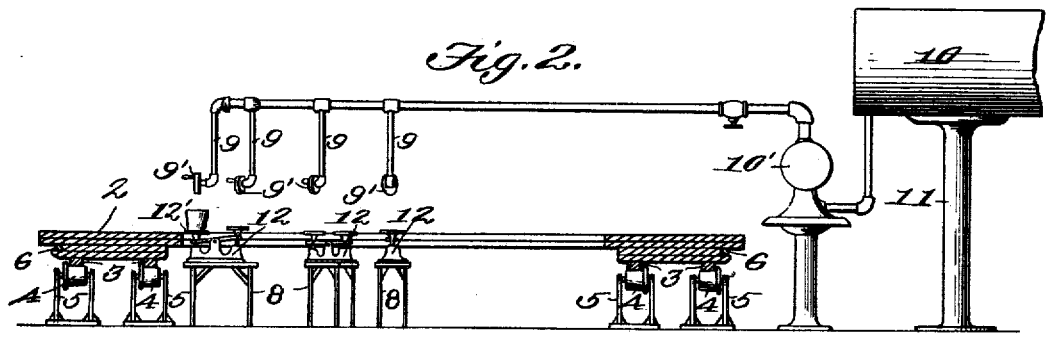

UNITED STATES PATENT OFFICE.

THOMAS W. TALIAFERRO, OF OMAHA, NEBRASKA.

APPARATUS FOR FACILITATING THE FILLING AND WEIGHING OF CANS, &c.

SPECIFICATION forming part of Letters Patent No. 683,811, dated October 1, 1901.

Application filed May 23, 1901. Serial No. 61,657. (No model.)

*To all whom it may concern:*

Be it known that I, THOMAS W. TALIAFERRO, a citizen of the United States, residing at Omaha, in the county of Douglas and State of Nebraska, have invented new and useful Improvements in Apparatus for Facilitating the Filling and Weighing of Cans, &c., of which the following is a specification.

This invention relates to a can filling, weighing, cooling, and distributing apparatus, and although it is especially intended for facilitating the operation of filling cans with lard, weighing, cooling, and distributing the same, the invention is not thus limited, for it will be obvious from the following description that the apparatus can be used with equally advantageous results in other fields.

By the use of the apparatus I am enabled to materially increase the output of the refineries and with a less number of laborers than is ordinarily employed with the existing methods.

The invention includes as one of its more important features a rotary can carrying, cooling, and distributing table of circular form and preferably of a width to support several rows of cans or pails, a stationary table or tables inside this circular table, and each stationary table is adapted to support a weighing-scale, and the man attending each scale stands with his side next the inner side of the rotary table and facing a stationary table, whereby the cans can be supplied to and removed from the scale-platforms with promptness, as will hereinafter appear. The cans are supplied from a suitably-located device to the rotary table, which conducts them to the operator or operators stationed at the stationary table or tables, who remove them therefrom and place them upon the scale platform or platforms and cause the delivery of the lard in a molten state thereto, the scales insuring the delivery of the precise amounts to the cans. The filled cans are then pushed from the scale-platforms onto the rotary table and are carried around with the same until their contents are cooled, when they are removed and placed in a crimping machine or machines for topping them. After the cans leave the crimping machine or machines they are delivered to a discharge chute or chutes to be carried to the boxing and store room. Therefore the cans or pails which are filled with lard are carried around without handling with the rotary table until their contents are cooled, and the cans, both empty and filled, are conducted to the laborers automatically, thereby doing away with the hand-labor usually employed for this purpose.

The invention also includes other points of novel construction, which, with the foregoing, will be hereinafter set forth at length, while the novelty will form the basis of the appended claims.

The invention is clearly illustrated in the accompanying drawings, forming a part of this specification, in which—

Figure 1 is a plan view of a can carrying, cooling, and distributing table and its coöperating parts with the superposed lard-supply tank removed. Fig. 2 is a side elevation of the apparatus.

Like characters refer to like parts in both figures of the drawings.

Referring now to the drawings, the numeral 2 designates a can carrying, cooling, and distributing table, which is illustrated as being of circular form and is of a suitable width—say sufficient to support five or more rows of cans of the standard size. The table 2 may be made of any suitable material, and it has on its under side circular fixed and parallel tracks, as 3, sustained by the rollers 4, arranged in pairs in a circular order under the table and rotatively supported by standards, as 5. The table has a peripheral groove to receive the driving-band 6, passing over suitable guide-sheaves, as 7, and driven by any suitable kind of motor. (Not shown.)

The upper side of the rotary table, upon which the cans are placed and removed in the operation of the apparatus, presents a flat continuous unobstructed surface lying in a horizontal plane.

The initial step in the operation of the apparatus is the placing of empty cans upon the rotary table, and this may be done by an operator stationed near the supply-chute 7'. The cans travel down said chute and are taken therefrom by hand and placed upon the upper side of the rotary table, the direction of movement of which is indicated by the arrow *a* in Fig. 1.

A series of stationary tables are shown as located inside the rotary table 2, and each of them is denoted by 8. An attendant fronts each stationary table and stands with his side next and in proximity to the inner curved side of the rotary table and takes the empty cans from the latter and places them under one of a series of supply-pipes, as 9, communicating with a vat, as 10, and containing the lard in its molten state. The lower ends of the supply-pipes are valved, as at 9', and when the valves are opened the lard can flow therefrom into the empty cans. I place between the supply-tank and the valved lower ends of the supply-pipe an agitator, as 10', serving its usual function. The tank may be supported in any suitable manner and at any convenient point. It is shown located at one side of the table 2 and above the same, it being sustained by uprights, as 11.

To obtain accurate filling of the cans, the same, with their contents, are weighed while being filled, and for this purpose the stationary tables 8 carry a series of scales, each table carrying its own scale. The scales are denoted by 12, and as they are of known kind it is deemed unnecessary to describe them in detail.

The upper surfaces of the stationary inside tables 8 are located a sufficient distance below the upper surface of the rotary table 2 that the scale-platforms 12' when empty will be situated a very short distance above said upper surface of the rotary table, so that when the cans contain their proper weight the upper surface of the platforms will have been caused to descend until they are in line, or substantially so, with the upper surface of the rotary table, and as the scale-platforms are adjacent and as close as possible to the rotary table it is simply necessary to push the filled cans off the scale platforms or pans onto said rotary table.

After the cans are filled and weighed they are again placed upon the table 2, which may be so operated that it revolves once in about five minutes, and after the cans are filled and placed upon the table 2 they are permitted to make five complete rotations, so as to allow the molten lard ample time to cool. The table is made wide enough to carry five rows of cans or pails of the average size, and as the filled cans are shoved thereonto from the scales they are pushed outward as far as they will go, and when there are five complete rows on the table this will indicate that the lard in the cans in the outer row is cool.

While I have shown a plurality of the stationary tables 8 and necessarily a plurality of weighing-scales 12, each of the former supporting one of the latter, this is not essential, for only one of each need be employed, though naturally more work can be accomplished with a series. The table also may be made wider or narrower than illustrated to support any desirable number of cans or rows of cans, and it can be operated at any speed.

Operators are stationed outside the table 2, and they take the filled cans from the table and place them in crimping-machines 13 (or machine) for topping them, and when this operation is concluded the topped and filled cans are placed in a discharge chute or chutes, as 14, (two being shown,) the receiving ends of which are situated in proximity to the respective machines, and said chutes deliver the filled and topped cans to the boxing and storage room.

The present mode of filling cans with lard is as follows: The empty cans are placed before the fillers by boys. When they are filled, they are allowed to stand for about half an hour to cool. Then they are carried by other boys to the crimping-machines, where the covers are put on, and subsequently they are carried from that machine by another gang to the boxing and store room.

By the improved machine hereinbefore described it will be seen, therefore, that the operation of supplying the cans, carrying them to the fillers, &c., is much simplified and that it can be carried on automatically with a much less number of operators than the old method just alluded to.

I have illustrated by the arrows in Fig. 1 the course taken by the cans.

Having described the invention, I claim—

1. In an apparatus of the class described, a rotary, circular, distributing, cooling and feeding table, and a stationary table inside the other one and carrying a weighing-scale, the platform of said weighing-scale being in proximity to said rotary table and its upper surface being normally a short distance above that of said table.

2. In an apparatus of the class described, a rotary, circular, distributing, cooling and feeding table, a stationary table inside the other one and carrying a weighing-scale, the platform of which is in proximity to said rotary table, and a valved pipe over said platform.

In testimony whereof I have hereunto set my hand in presence of two subscribing witnesses.

THOMAS W. TALIAFERRO.

Witnesses:
J. E. MATHER,
M. L. SEARS.